(12) United States Patent
Zhang et al.

(10) Patent No.: US 12,248,651 B2
(45) Date of Patent: Mar. 11, 2025

(54) TOUCH SUBSTRATE AND DISPLAY DEVICE

(71) Applicant: Wuhan China Star Optoelectronics Semiconductor Display Technology Co., Ltd., Hubei (CN)

(72) Inventors: Chenghao Zhang, Hubei (CN); Leilei Luo, Hubei (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 18/504,290

(22) Filed: Nov. 8, 2023

(65) Prior Publication Data
US 2025/0036243 A1 Jan. 30, 2025

(30) Foreign Application Priority Data
Jul. 24, 2023 (CN) .......................... 202310923231.9

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ............................................ G06F 2203/04107
See application file for complete search history.

(56) References Cited

U.S. PATENT DOCUMENTS

2022/0083173 A1* 3/2022 Yang ..................... G06F 3/0446
2022/0391041 A1* 12/2022 Kang .................... G06F 3/0446

* cited by examiner

*Primary Examiner* — Robin J Mishler
(74) *Attorney, Agent, or Firm* — Nathan & Associates; Menachem Nathan

(57) ABSTRACT

A touch substrate and a display device are disclosed. The touch substrate has a folding line, the touch substrate including a touch region and a non-touch region. The non-touch region includes a first non-touch region, a second non-touch region, and a third non-touch region between the first non-touch region and the second non-touch region. The touch substrate includes: multiple first electrode groups; multiple second electrode groups; a touch integrated circuit in the third non-touch region; multiple first sub-electrode group connecting lines in the first non-touch region; and a shielded line.

16 Claims, 5 Drawing Sheets

TOUCH SUBSTRATE AND DISPLAY DEVICE

CROSS-REFERENCE TO RELATED APPLICATION

This application claims priority to Chinese Application No. 202310923231.9, filed on Jul. 24, 2023. The contents of which are incorporated herein by reference in their entireties.

FIELD

The present disclosure relates to display technologies, and specifically to a touch substrate and a display device.

BACKGROUND

With the development of touch technologies, currently there are a variety of touch technologies such as resistive touch, capacitive touch, optical touch, ultrasonic touch, and so on. At present, capacitive touch is mainstream product technology because the capacitive touch technology supports multi-touch and has excellent performance and other advantages. The capacitive touch technology may be divided into two types: self-capacitance and mutual-capacitance. In a mutual-capacitance touchscreen, two types of electrodes, a driving electrode (TX) and an induction electrode (RX), are used. The driving electrode provides an excitation signal and the induction electrode receives the signal. All the electrodes constitute coordinates of a two-dimensional plane of the entire touchscreen. The coordinate of each touch point can be calculated based on a signal change caused by a two-dimensional capacitance change of the touchscreen.

Because each Tx or Rx channel has two terminals and at least one terminal of each Tx or Rx channel is connected to a touch integrated circuit (Touch IC. TIC), there are a total of four driving modes: 1TIR, 1T2R, 2TIR, and 2T2R. Currently, most of vertically foldable phones on the market use the 1TIR driving mode. In this driving mode, induction electrode connecting lines in a left frame close to a folding line are all close to an in-plane driving electrode in the lower half, forming an obvious coupling and resulting in an increase in the deviation between raw data of two adjacent induction electrode connecting lines. Therefore, it is necessary to provide a new touch substrate to resolve the foregoing problems.

SUMMARY

A touch substrate according to the present disclosure has a folding line. The touch substrate includes: a touch region; and a non-touch region, the non-touch region including a first non-touch region and a second non-touch region respectively on two sides of the touch region, and a third non-touch region between the first non-touch region and the second non-touch region. The touch substrate includes: multiple first electrode groups, extending along a first direction parallel to the folding line, spaced along a second direction intersecting the first direction, and disposed in the touch region, at least one of the plurality of first electrode groups including a first sub-electrode group on a side of the folding line away from the third non-touch region and a second sub-electrode group on a side of the folding line close to the third non-touch region; multiple second electrode groups, extending along the second direction, spaced along the first direction, and disposed in the touch region; a touch integrated circuit (IC) in the third non-touch region; multiple first sub-electrode group connecting lines in the first non-touch region, a terminal of each of the multiple first sub-electrode group connecting lines being correspondingly electrically connected to one of the multiple first sub-electrode groups, and another terminal of each of the multiple first sub-electrode group connecting lines being electrically connected to the touch IC; and a shielded line between the touch region and one of the multiple first sub-electrode groups connecting line electrically connected to one of the multiple first sub-electrode groups adjacent to the folding line.

Further, the shielded line is electrically connected to the touch IC.

Further, the shielded line is spaced apart and insulated from at least one of the multiple first sub-electrode group connecting lines.

Further, a ratio of a width of the shielded line to a width of at least one of the multiple first sub-electrode group connecting lines ranges from 1 to 3.

Further, each of the multiple second electrode groups includes multiple driving electrodes electrically connected to each other, each of the multiple driving electrodes including: a second main electrode extending along the second direction; one or more second branch electrodes connected to the second main electrode and crossing the second main electrode, the one or more second branch electrodes including one or more first sub-branch electrodes on a side of the folding line away from the third non-touch region, and one or more second sub-branch electrodes on a side of the folding line close to the third non-touch region; and one or more virtual test blocks, wherein each of the one or more virtual test blocks is between one of the one or more sub-branch electrodes and the shielded line.

Further, each of the one or more virtual test blocks is spaced apart and insulated from one of the one or more sub-branch electrodes.

Further, a spacing between each of the one or more virtual test blocks and one of the one or more second sub-branch electrodes ranges from 3 μm to 7 μm.

Further, a distance between a side of each of the one or more virtual test blocks away from one of the one or more second sub-branch electrodes and a side of one of the one or more second sub-branch electrodes away from each of the one or more virtual test blocks is equal to a length of the first sub-branch electrode.

Further, the one or more virtual test blocks and the one or more second sub-branch electrodes are made of a same material.

A display device according the present disclosure includes a touch substrate according the present disclosure.

DETAILED DESCRIPTION

Figure 1:
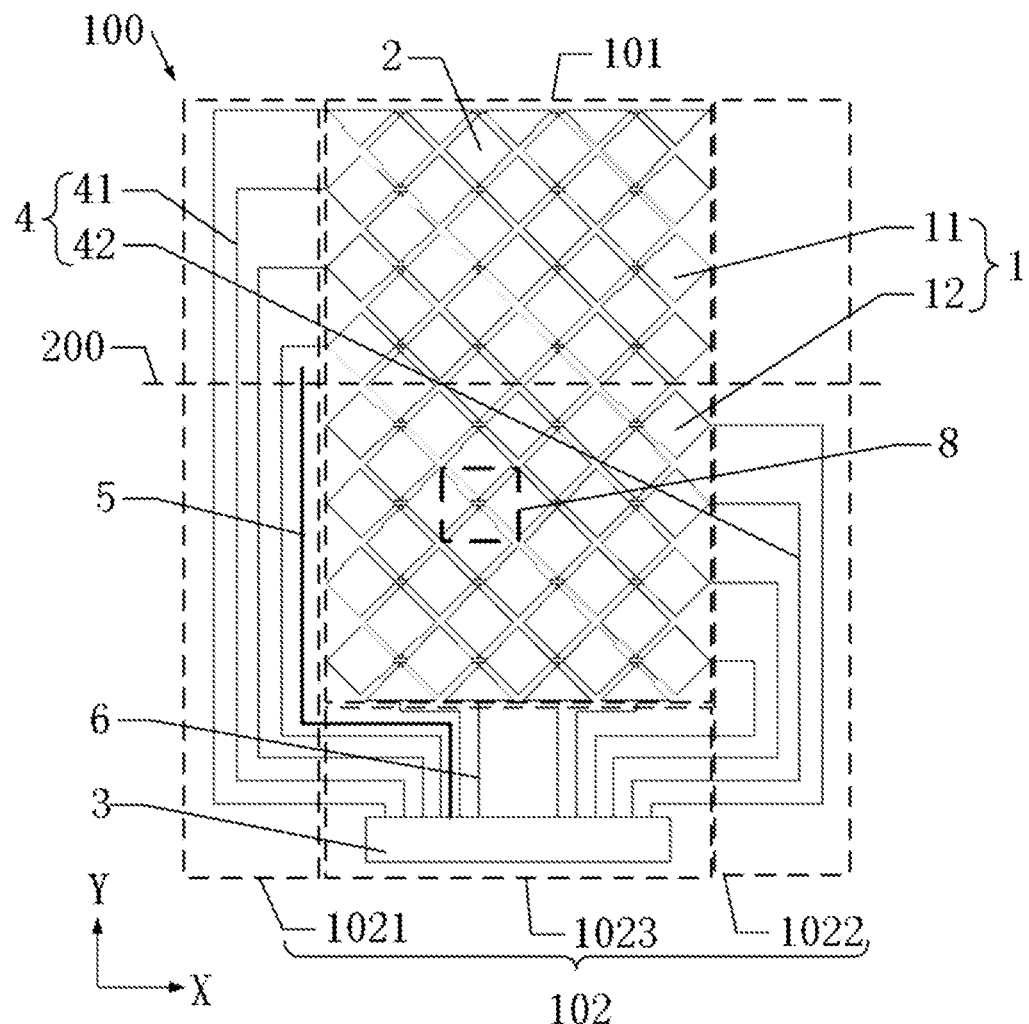
FIG. 1 is a schematic diagram of a touch substrate according to one or more embodiments.

The following describes preferred embodiments of the present disclosure in detail with reference to the accompanying drawings of the specification, to completely introduce the technical contents of the present disclosure, use examples to prove the feasibility of the present disclosure, and make the technical contents provided in the present disclosure clearer, allowing those skilled in the art to better understand how to implement the present disclosure. However, the present disclosure may be embodied in various forms of embodiments. Therefore, the protection scope of the present disclosure is not limited to the embodiments described in the specification, and the description of the following embodiments is not intended to limit the protection scope of the present disclosure.

The directional terms mentioned in the present disclosure, for example, "upper", "lower". "before", "after", "left", "right", "inside", "outside", and "side", are merely directions in the drawings. The directional terms used herein are used to explain and illustrate the present disclosure, and are not intended to limit the protection scope of the present disclosure.

In the accompanying drawings, components with the same structure are denoted by the same numerals, and components with similar structures or functions are denoted by similar numerals. In addition, for ease of understanding and description, the size and thickness of each component shown in the accompanying drawings are arbitrarily shown, but the present disclosure is not limited thereto.

A display device according to the present disclosure may be an organic light-emitting diode (OLED) display device, an active-matrix organic light-emitting diode (AMOLED) display device, a mini light-emitting diode (mini-LED) display device, a micro light-emitting diode (micro-LED) display device or other types of light-emitting display devices. The display device includes a touch substrate 100. In practice, the display device further includes a substrate layer, an array substrate, a light-emitting layer, an encapsulation layer, a polarizer, a cover plate, and other film layers, which will not be described in detail herein.

As shown in FIG. 1, the touch substrate 100 has a folding line 200. The folding line 200 herein is a folding line of the display device. In one or more embodiments, the folding line 200 is a center line of a touch region.

As shown in FIG. 1, the touch substrate 100 includes a touch region 101 and a non-touch region 102. The non-touch region 102 includes a first non-touch region 1021 and a second non-touch region 1022 respectively on two sides of the touch region 101, and a third non-touch region 1023 between the first non-touch region 1021 and the second non-touch region 1022. In some other embodiments, the non-touch region 102 may further include a fourth non-touch region opposite to the third non-touch region 1023.

As shown in FIG. 1, the touch substrate 100 includes multiple first electrode groups 1, multiple second electrode groups 2, a touch integrated circuit (IC) 3, multiple first electrode group connecting lines 4, a shielded line 5, and multiple second electrode group connecting lines 6.

The multiple first electrode groups 1 extend along a first direction X parallel to the folding line 200, are spaced along a second direction Y intersecting the first direction X, and are disposed in the touch region 101. In one or more embodiments, the first direction X and the second direction Y are perpendicular to each other. In one or more embodiments, each of the multiple first electrode groups 1 includes multiple induction electrodes (Rx) electrically connected to each other.

Figure 3:
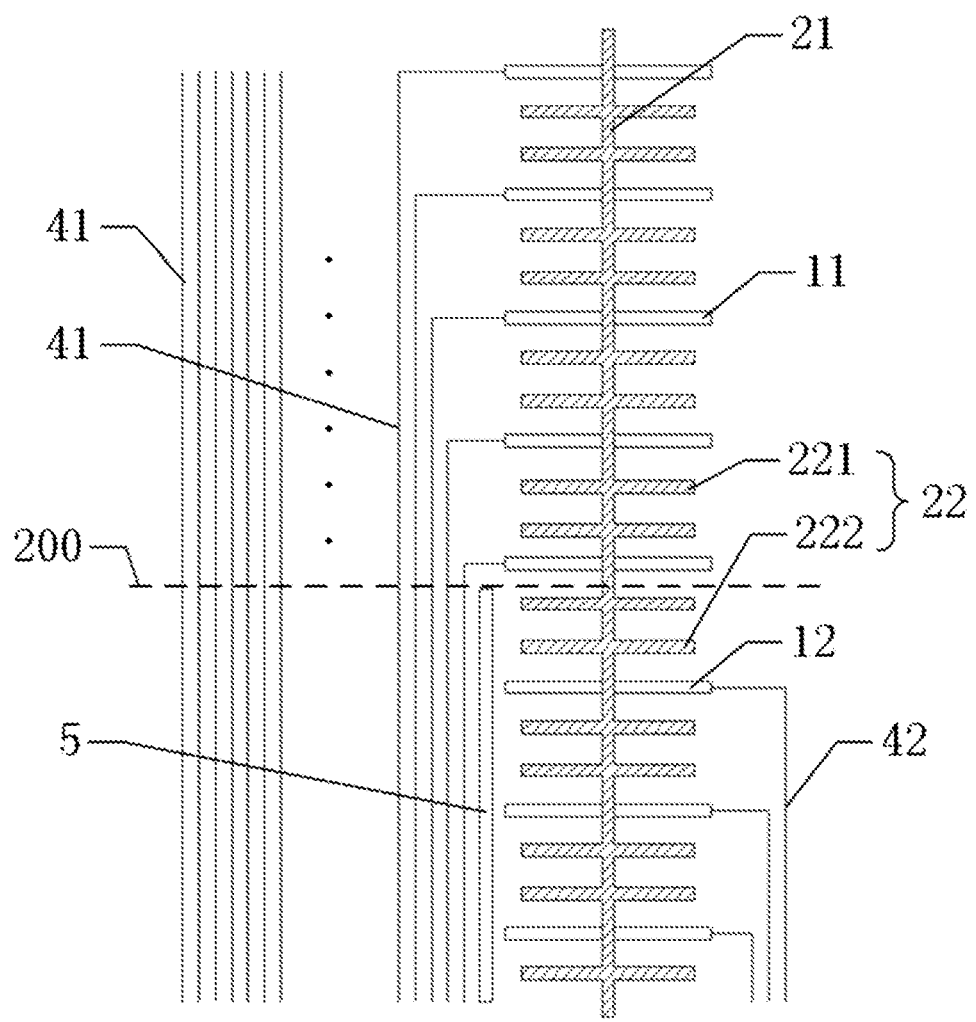
FIG. 3 is a schematic wiring diagram of a touch substrate according to one or more embodiments.

As shown in FIG. 1 and in FIG. 3, each first electrode group 1 includes a first sub-electrode group 11 on a side of the folding line 200 away from the third non-touch region 1023 and a second sub-electrode group 12 on a side of the folding line 200 close to the third non-touch region 1023.

The multiple second electrode groups 2 extend along the second direction Y, are spaced along the first direction X, and are disposed in the touch region 101. In one or more embodiments, each of the multiple second electrode groups 2 includes multiple driving electrodes (Tx) electrically connected to each other.

As shown in FIG. 1, in one first electrode group 1 and one second electrode groups 2 that intersect each other, an induction electrode at the intersection and a corresponding crossing driving electrode constitute a touch unit 8.

Figure 2:
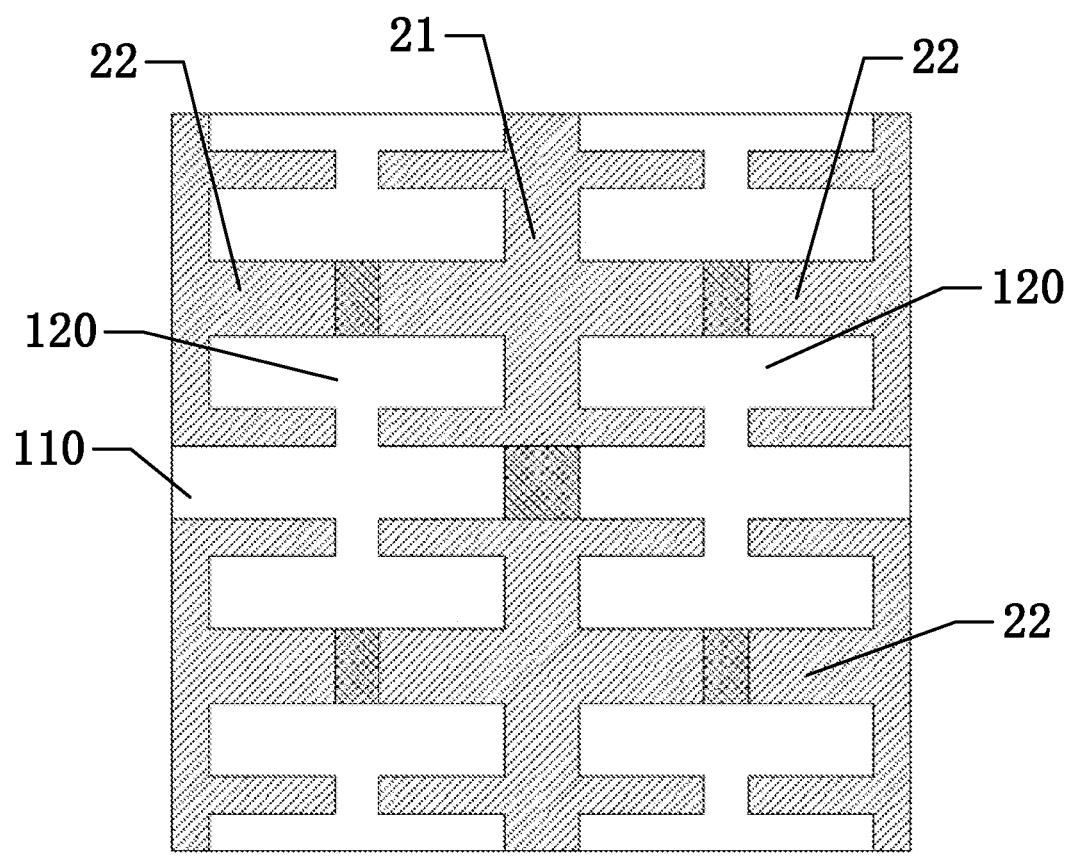
FIG. 2 is a schematic plan view of a touch unit according to one or more embodiments.

As shown in FIG. 2, each of the induction electrodes includes a first main electrode 110 and one or more first branch electrodes 120.

The first main electrode 110 extends along the first direction X. At least one first branch electrode 120 is connected to the first main electrode 110 and is disposed crossing the first main electrode 110.

As shown in FIG. 2, each of the driving electrodes includes a second main electrode 21 and one or more second branch electrodes 22.

The second main electrode 21 extends along the second direction Y. At least one second branch electrode 22 is connected to the second main electrode 21, and is disposed crossing the second main electrode 21.

A second branch electrode 22 of the driving electrode on a side of the folding line 200 away from the third non-touch region 1023 is a first sub-branch electrode 221, and a second branch electrode 22 of the driving electrode on a side of the folding line 200 close to the third non-touch region 1023 is a second sub-branch electrode 222. The touch IC 3 is disposed in the third non-touch region 1023.

A terminal of each of the multiple first electrode group connecting lines 4 is correspondingly electrically connected to one of the multiple first electrode groups 1, and another terminal of each of the multiple first electrode group connecting lines 4 is electrically connected to the touch IC 3. To be specific, the first electrode group connecting lines 4 include multiple first sub-electrode group connecting lines 41 and multiple second sub-electrode group connecting lines 42.

As shown in FIG. 1 and in FIG. 3, the multiple first sub-electrode group connecting lines 41 are disposed in the first non-touch region 1021, and a terminal of each of the multiple first sub-electrode group connecting lines 41 is correspondingly electrically connected to one of the first sub-electrode groups 11, and another terminal of each of the multiplef irst sub-electrode group connecting lines 41 is electrically connected to the touch IC 3.

As shown in FIG. 1 and in FIG. 3, the multiple second sub-electrode group connecting lines 42 are disposed in the second non-touch region 1022, and a terminal of each of the second sub-electrode group connecting lines 42 is correspondingly electrically connected to one of the second sub-electrode groups 12, and another terminal of each of the second sub-electrode group connecting lines 42 is electrically connected to the touch IC 3.

As shown in FIG. 1 and in FIG. 3, a shielded line 5 is disposed between the touch region 101 and the first sub-electrode group connecting line 41 electrically connected to the first sub-electrode group 11 adjacent to the folding line 200. The arrangement of the shielded line 5 increases the spacing between the second electrode group 2 in the touch region 101 and the first sub-electrode group connecting line 41 electrically connected to the first sub-electrode group 11 adjacent to the folding line 200, to reduce the coupling between the second electrode group 2 in the touch region 101 and the first sub-electrode group connecting line 41 electrically connected to the first sub-electrode group 11 adjacent to the folding line 200, thereby reducing the deviation between raw data of two adjacent induction electrode connecting lines and improving uniformity of the entire touch substrate 100.

The shielded line 5 is spaced apart and insulated from the first sub-electrode group connecting line 41. A ratio of a width of the shielded line 5 to a width of the first sub-electrode group connecting line 41 ranges from 1 to 3. In one or more embodiments, the ratio of the width of the shielded line 5 to the width of the first sub-electrode group connecting line 41 is 2. Therefore, the spacing between the second electrode group 2 in the touch region 101 and the first sub-electrode group connecting line 41 electrically connected to the first sub-electrode group 11 adjacent to the folding line 200 is greatly increased.

In one or more embodiments, the shielded line 5 is electrically connected to the touch IC 3, so that signals of part of the second electrode group 2 are coupled to the shielded line 5 and the coupling between the second electrode group 2 in the touch region 101 and the first sub-electrode group connecting line 41 electrically connected to the first sub-electrode group 11 adjacent to the folding line 200 is reduced, thereby further reducing the deviation between raw data of two adjacent induction electrode connecting lines and improving uniformity of the entire touch substrate.

A terminal of each of the multiple second electrode group connecting lines 6 is electrically connected to one of the second electrode groups 2, and another terminal of each of the plurality of second electrode group connecting lines 6 is electrically connected to the touch IC 3.

Figure 4:
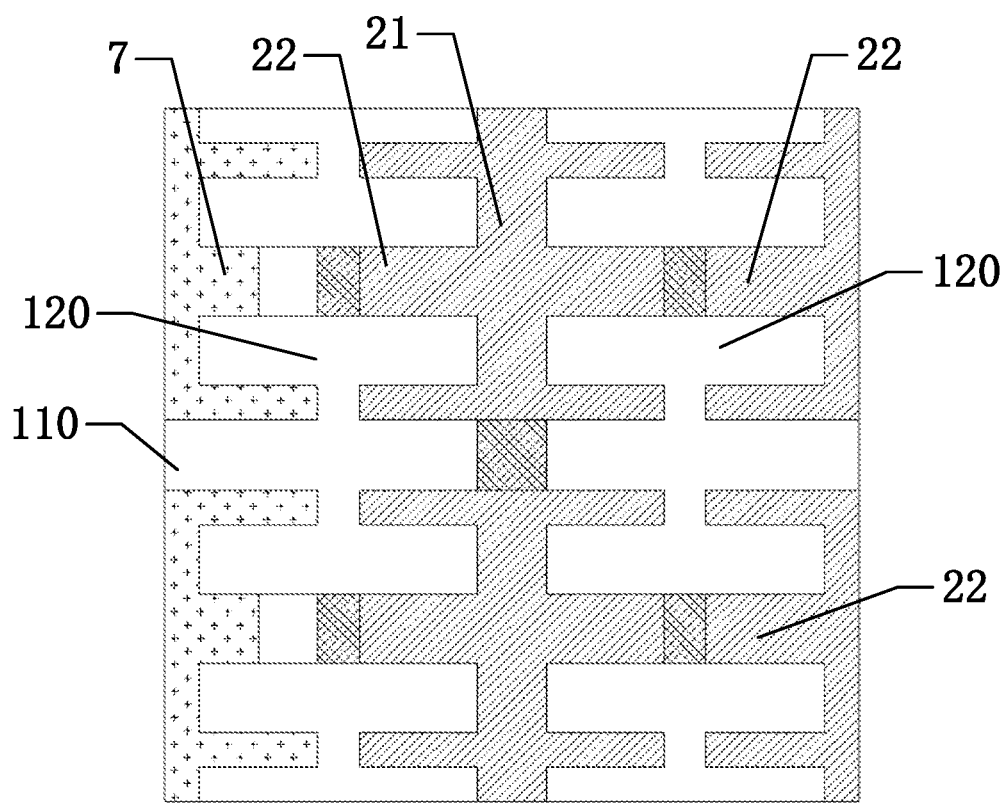
FIG. 4 is a schematic plan view of a touch unit according to one or more embodiments.
Figure 5:
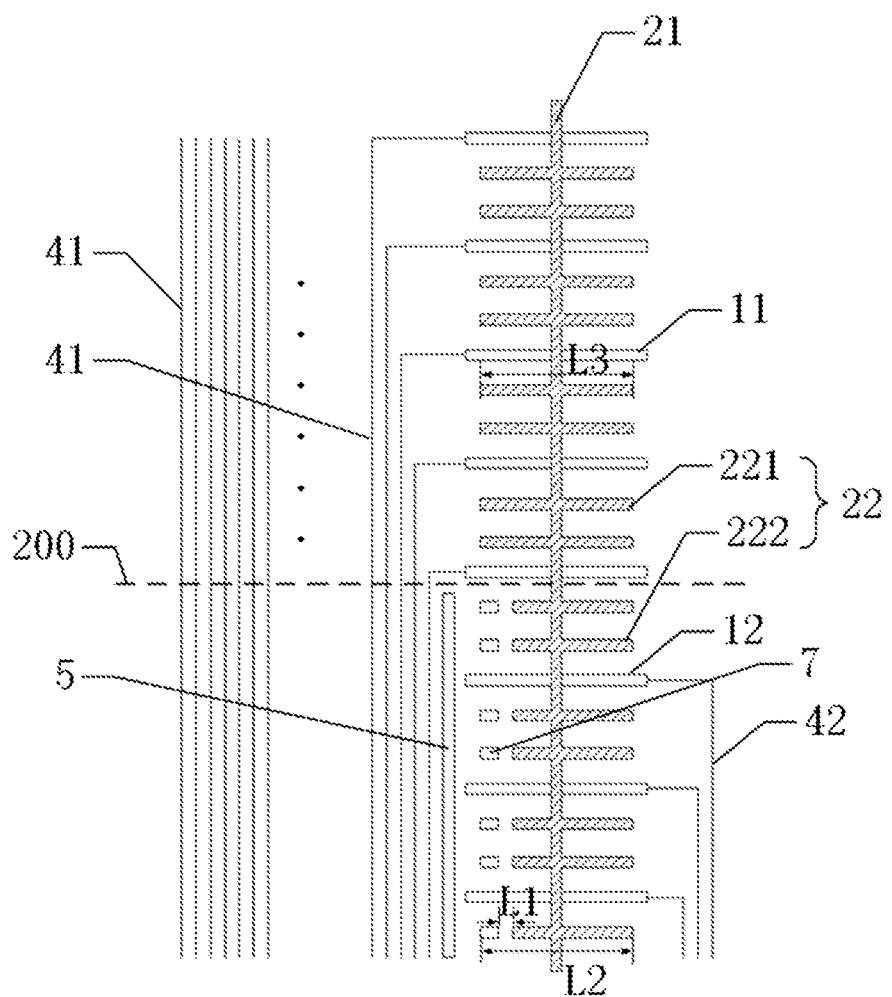
FIG. 5 is a schematic wiring diagram of a touch substrate according to one or more embodiments.

As shown in FIG. 4 and FIG. 5, in one or more embodiments, the touch substrate 100 further includes at least one virtual test block 7. The virtual test block 7 is disposed between at least one of the second sub-branch electrodes 222 and the shielded line 5. Therefore, the spacing between the second sub-branch electrode 222 and the first sub-electrode group connecting line 41 electrically connected to the first sub-electrode group 11 adjacent to the folding line 200 is further increased, and the coupling between the second electrode group 2 in the touch region 101 and the first sub-electrode group connecting line 41 electrically connected to the first sub-electrode group 11 adjacent to the folding line 200 is reduced, thereby reducing the deviation between raw data of two adjacent induction electrode connecting lines and improving uniformity of the entire touch substrate.

The virtual test block 7 is spaced apart and insulated from the second sub-branch electrode 222. A spacing $L_1$ between the virtual test block 7 and the second sub-branch electrode 222 ranges from 3 μm to 7 μm. In one or more embodiments, the spacing $L_1$ between the virtual test block 7 and the second sub-branch electrode 222 is 5 μm.

A spacing $L_2$ between a side of the virtual test block 7 away from the second sub-branch electrode 222 and a side of the second sub-branch electrode 222 away from the virtual test block 7 is equal to a length $L_3$ of the first sub-branch electrode 221. A material of the virtual test block 7 is same as a material of the second sub-branch electrode 222. Therefore, a terminal of the second sub-branch electrode 222 close to the shielded line 5 may be broken to form the virtual test block 7 disposed between the second sub-branch electrode 222 and the shielded line 5.

Further, the touch substrate and the display device according to the present disclosure are described in detail above. The principles and implementations of the present disclosure are described by using specific examples in this specification, and the descriptions of the embodiments are merely intended to help understand the methods and core ideas of the present disclosure. Meanwhile, a person skilled in the art may make modifications to the specific implementations and application scopes according to the ideas of the present disclosure. In conclusion, the content of this specification should not be construed as a limitation to the present disclosure.

What is claimed is:

1. A touch substrate, having a folding line, the touch substrate comprising:
   a touch region; and
   a non-touch region, wherein the non-touch region comprises a first non-touch region and a second non-touch region respectively on two sides of the touch region, and a third non-touch region between the first non-touch region and the second non-touch region;
   the touch substrate comprising:
   a plurality of first electrode groups, extending along a first direction parallel to the folding line, spaced along a second direction intersecting the first direction, and disposed in the touch region, wherein at least one of the plurality of first electrode groups comprises a first sub-electrode group on a side of the folding line away from the third non-touch region and a second sub-electrode group on a side of the folding line close to the third non-touch region;
   a plurality of second electrode groups, extending along the second direction, spaced along the first direction, and disposed in the touch region;
   a touch integrated circuit (IC) in the third non-touch region;
   a plurality of first sub-electrode group connecting lines in the first non-touch region, wherein a terminal of each of the plurality of first sub-electrode group connecting lines is correspondingly electrically connected to one of the plurality of first sub-electrode groups, and another terminal of each of the plurality of first sub-electrode group connecting lines is electrically connected to the touch IC; and
   a shielded line between the touch region and one of the plurality of first sub-electrode groups connecting line electrically connected to one of the plurality of first sub-electrode groups adjacent to the folding line;
   wherein each of the plurality of second electrode groups comprises a plurality of driving electrodes electrically connected to each other, wherein each of the plurality of driving electrodes comprises:
   a second main electrode extending along the second direction;
   one or more second branch electrodes connected to the second main electrode and crossing the second main electrode, wherein the one or more second branch electrodes comprise one or more first sub-branch electrodes on a side of the folding line away from the third non-touch region, and one or more second sub-branch electrodes on a side of the folding line close to the third non-touch region; and
   one or more virtual test blocks, wherein each of the one or more virtual test blocks is between one of the one or more sub-branch electrodes and the shielded line.

2. The touch substrate according to claim 1, wherein the shielded line is electrically connected to the touch IC.

3. The touch substrate according to claim 1, wherein the shielded line is spaced apart and insulated from at least one of the plurality of first sub-electrode group connecting lines.

4. The touch substrate according to claim 1, wherein a ratio of a width of the shielded line to a width of at least one of the plurality of first sub-electrode group connecting lines ranges from 1 to 3.

5. The touch substrate according to claim 1, wherein each of the one or more virtual test blocks is spaced apart and insulated from one of the one or more sub-branch electrodes.

6. The touch substrate according to claim 1, wherein a spacing between each of the one or more virtual test blocks and one of the one or more second sub-branch electrodes ranges from 3 μm to 7 μm.

7. The touch substrate according to claim 1, wherein a distance between a side of each of the one or more virtual test blocks away from one of the one or more second sub-branch electrodes and a side of one of the one or more second sub-branch electrodes away from each of the one or more virtual test blocks is equal to a length of the first sub-branch electrode.

8. The touch substrate according to claim 1, wherein the one or more virtual test blocks and the one or more second sub-branch electrodes are made of a same material.

9. A display device comprising a touch substrate, wherein the touch substrate has a folding line,
the touch substrate comprises:
a touch region; and
a non-touch region, wherein the non-touch region comprises a first non-touch region and a second non-touch region respectively on two sides of the touch region, and a third non-touch region between the first non-touch region and the second non-touch region;
the touch substrate comprises:
a plurality of first electrode groups, extending along a first direction parallel to the folding line, spaced along a second direction intersecting the first direction, and disposed in the touch region, wherein at least one of the plurality of first electrode groups comprises a first sub-electrode group on a side of the folding line away from the third non-touch region and a second sub-electrode group on a side of the folding line close to the third non-touch region;
a plurality of second electrode groups, extending along the second direction, spaced along the first direction, and disposed in the touch region;
a touch integrated circuit (IC) in the third non-touch region;
a plurality of first sub-electrode group connecting lines in the first non-touch region, wherein a terminal of each of the plurality of first sub-electrode group connecting lines is correspondingly electrically connected to one of the plurality of first sub-electrode groups, and another terminal of each of the plurality of first sub-electrode group connecting lines is electrically connected to the touch IC; and
a shielded line between the touch region and one of the plurality of first sub-electrode groups connecting line electrically connected to one of the plurality of first sub-electrode groups adjacent to the folding line;
wherein each of the plurality of second electrode groups comprises a plurality of driving electrodes electrically connected to each other, wherein each of the plurality of driving electrodes comprises:
a second main electrode extending along the second direction;
one or more second branch electrodes connected to the second main electrode and crossing the second main electrode, wherein the one or more second branch electrodes comprise one or more first sub-branch electrodes on a side of the folding line away from the third non-touch region, and one or more second sub-branch electrodes on a side of the folding line close to the third non-touch region; and
one or more virtual test blocks, wherein each of the one or more virtual test blocks is between one of the one or more sub-branch electrodes and the shielded line.

10. The display device according to claim 9, wherein the shielded line is electrically connected to the touch IC.

11. The display device according to claim 9, wherein the shielded line is spaced apart and insulated from at least one of the plurality of first sub-electrode group connecting lines.

12. The display device according to claim 9, wherein a ratio of a width of the shielded line to a width of at least one of the plurality of first sub-electrode group connecting lines ranges from 1 to 3.

13. The display device according to claim 9, wherein each of the one or more virtual test blocks is spaced apart and insulated from one of the one or more sub-branch electrodes.

14. The display device according to claim 9, wherein a spacing between each of the one or more virtual test blocks and one of the one or more second sub-branch electrodes ranges from 3 μm to 7 μm.

15. The display device according to claim 9, wherein a distance between a side of each of the one or more virtual test blocks away from one of the one or more second sub-branch electrodes and a side of one of the one or more second sub-branch electrodes away from each of the one or more virtual test blocks is equal to a length of the first sub-branch electrode.

16. The display device according to claim 9, wherein the one or more virtual test blocks and the one or more second sub-branch electrodes are made of a same material.

* * * * *